(12) United States Patent
Koskuba, Jr.

(10) Patent No.: US 6,198,226 B1
(45) Date of Patent: Mar. 6, 2001

(54) LOW-NOISE DRIVE CIRCUIT FOR ELECTROLUMINESCENT LAMP, AND ELECTROLUMINESCENT LAMP ASSEMBLY COMPRISING SAME

(75) Inventor: William V. Koskuba, Jr., Orford, NH (US)

(73) Assignee: Astronics Corporation, Buffalo, NY (US)

( * ) Notice: Subject to any disclaimer, the term of this patent is extended or adjusted under 35 U.S.C. 154(b) by 0 days.

(21) Appl. No.: 09/376,240

(22) Filed: Aug. 18, 1999

(51) Int. Cl.$^7$ ........................................... G09G 3/10
(52) U.S. Cl. ................................. 315/169.3; 315/242
(58) Field of Search .................... 315/169.3, 242, 315/243, 244, 132, 194, 259, 283, 258, 356

(56) References Cited

U.S. PATENT DOCUMENTS

| | | | |
|---|---|---|---|
| 4,712,170 | * 12/1987 | Grace | 363/98 |
| 5,517,089 | * 5/1996 | Ravid | 315/307 |
| 5,532,553 | * 7/1996 | Flory, IV | 315/169.3 |
| 5,566,064 | 10/1996 | Schoenwald et al. | 363/132 |
| 5,719,472 | * 2/1998 | Kachmarik et al. | 315/224 |
| 5,723,953 | * 3/1998 | Nerone et al. | 315/307 |
| 5,789,870 | 8/1998 | Remson | 315/194 |
| 5,828,187 | * 10/1998 | Fischer | 315/291 |
| 5,859,504 | * 1/1999 | Nerone | 315/307 |
| 5,861,719 | * 1/1999 | Koskowich et al. | 315/209 R |

* cited by examiner

Primary Examiner—Don Wong
Assistant Examiner—Trinh Vo Dinh
(74) Attorney, Agent, or Firm—Steven J. Hultquist; William A. Barrett; Marianne Fuierer

(57) ABSTRACT

A circuit driving an electroluminescent lamp at a frequency at or in the vicinity of the lower threshold of human hearing, thus reducing objectionable noise otherwise generated by such lamps when operated at high frequencies. In an electroluminescent lamp assembly including such driving circuit is described, the electroluminescent lamp is driven at low frequency, but nonetheless provides a high level of illumination output.

18 Claims, 3 Drawing Sheets

LOW-NOISE DRIVE CIRCUIT FOR ELECTROLUMINESCENT LAMP, AND ELECTROLUMINESCENT LAMP ASSEMBLY COMPRISING SAME

BACKGROUND OF THE INVENTION

1. Field of Invention

This invention generally relates to low-noise drive circuits for electroluminescent lamps and electroluminescent lamp assemblies comprising same, and more specifically to a circuit driving an electroluminescent lamp at a frequency at or below the lower threshold of human hearing, thus reducing objectionable noise otherwise generated by such lamps when operated at high frequencies.

2. Description of the Related Art

Electroluminescent lamps are light emitting devices commonly used to provide back lighting in a variety of display applications, including for example wristwatches, portable telephones, remote controls, personal digital assistants, automobile dashboards, avionics instrumentation, and the like.

A typical electroluminescent lamp comprises a thin layer of electroluminescent material—a material that emits light when excited by an electrical field—sandwiched between two thin, electrically conductive electrode layers. At least one of these layers is optically transparent at the wavelength of the electroluminescent emission. By applying a voltage across the two electrode layers, an electric field is induced between them. Tile electroluminescent material is thereby excited and resultantly emits light that is visible through the optically transparent electrode.

The light that is produced by the electroluminescent lamp is essentially uniform across the surface area ("lit area") of its optically transparent electrode. The electroluminescent lamp therefore is ideally suited as a backlight for analog and liquid crystal digital displays.

Due to its structure—two conductive electrodes with a dielectric layer between them—the electroluminescent lamp functionally behaves as a capacitor. The electric field induced by the applied voltage thus decreases as a charge accumulates on one of the electrodes, and correspondingly the light production of the electroluminescent material is attenuated or the electroluminescent material will at charge saturation conditions even cease to emit light.

Alternating current (AC) voltage must accordingly be applied to the electrodes of the electroluminescent lamp to maintain continuous illumination. Typically, AC voltage in the frequency range of 200 Hz to 1000 Hz is used to drive electroluminescent lamps.

Numerous circuits and systems exist within the prior art for driving electroluminescent lamps from low voltage batteries.

U.S. Pat. No. 5,854,539 to Pace, et al. discloses a driving circuit, which produces an alternating current by selectively coupling an inductor to the supply voltage such that current is induced in either of two directions through the inductor. A set of switches then couples the energy that is stored in the inductor across the electroluminescent lamp, alternatively charging it first positively and then negatively in cyclic fashion.

U.S. Pat. No. 5,861,719, to Koskowich, et. al. discloses an electroluminescent lamp driving circuit with a voltage limiting feedback featuring a capacitive voltage divider, to reduce resistive losses and electromagnetic interference.

An inherent problem with electroluminescent lamps is that in operation, such devices emit acoustic energy within the audible range of sound waves, producing an associated objectionable buzz or hum. This noise is particularly problematic in applications such as mobile telephones, which in operation are held close to the user's ear and in which any appreciable noise interferes with the use and operability of the device.

U.S. Pat. No. 5,789,870 to Remson, et al. discloses an approach to reducing the noise generated by electroluminescent lamps. This patent describes a drive circuit, which predicts the transitions from positive to negative charge, and vice versa, and effectively damps these transitions. By increasing the rise and fall times of the voltage pulses applied to the electroluminescent lamp, the transitions of charge at the front and rear electrodes of the lamp are less abrupt. This in turn reduces the rate of physical deformation of the lamp electrodes resulting from opposite electrical charges, and reduces the audible output of the lamp assembly.

The solution described in the Remson et al. patent, however, requires a complex electronic driving circuit, comprising a plurality of operational amplifiers, transistors, diodes, resistors, and capacitors. The component values of these circuit elements must be selected so as to operate properly at each desired frequency.

U.S. Pat. No. 5,566,064 to Schoenwald, et. al. discloses an electroluminescent lamp drive system for eliminating the large magnetic component of resonant inverters operating at low frequencies. This drive system is intended to eliminate the audible energy generated by the mechanical windings and core laminations of the inductor which result from its being driven at frequencies within the human audible range. Schoenwald utilizes a pulse width modulated signal, with the pulse frequency being above the range of human hearing.

The electroluminescent lamp drive system described in the Schoenwald, et. al. patent, however, also requires complex driving circuitry, and addresses only the audible noise that is generated by the inductor. The Schoenwald, et. al. system does not address noise generated from the surface(s) of the electroluminescent lamp itself.

Accordingly, an object of the present invention is to provide a simple, cost-effective driver circuit for electroluminescent lamps which minimizes their objectionable audible output.

Another object of the present invention, based on the fact that the sensitivity of the human ear decreases with frequency below about 1 kHz, is to provide a drive circuit for electroluminescent lamps that operates at a frequency of approximately 60 to 70 Hz, thereby providing an electroluminescent lamp system that has a very low and substantially imperceptible noise output.

Yet another object of the present invention is to provide an efficient electroluminescent lamp assembly in which the electroluminescent lamp is driven at low frequency, but nonetheless provides a high level of illumination output.

A further object of the invention is to provide an electroluminescent lamp operable at a low frequency, by increasing the amplitude of the drive voltage.

A still further object of the invention is to provide an electroluminescent lamp having an extended operational life by virtue of its capability to function at a decreased frequency level.

Other objects, features and advantages of the present invention will be more fully apparent from the ensuing disclosure and appended claims.

SUMMARY OF THE INVENTION

The present invention generally relates to low-noise drive circuits for electroluminescent lamps and electroluminescent lamp assemblies comprising same.

In one aspect, the invention relates to a circuit driving an electroluminescent lamp at a frequency at or below the lower threshold of human hearing, thus reducing objectionable noise otherwise generated by such lamps when operated at high frequencies.

Such circuitry may comprise in a specific embodiment of the invention a self-excited oscillator and transformer circuit arranged for operation with an associated power source.

The oscillator may be constructed and arranged for low frequency operation at a suitable frequency, e.g., in a range of from about 50 to about 70 Hertz.

The circuitry for driving an electroluminescent lamp according to the invention is typically operated at a frequency of below about 150 Hertz, more preferably below about 100 Hertz, and most preferably below about 90 Hertz. When the drive circuitry of the electroluminescent lamp is arranged to operate at a frequency below about 150 Hertz, as is permitted by the specific circuit arrangement of the present invention, the electroluminescent lamp system has a very low and substantially imperceptible noise output, which is even further attenuated at lower frequency levels.

Another aspect of the invention relates to a method of driving an electroluminescent lamp at a low frequency producing a very low and substantially imperceptible noise output using a conventional power source, as for example a 50 or 60 Hz power line.

In another aspect of the invention, an integrated circuit "chip inverter" is used to drive an electroluminescent lamp at a frequency below 100 Hz. This IC chip inverter requires a relatively higher output voltage rating than commonly employed in the art, to recover luminescence from the electroluminescent lamp which is lost as a consequence of low drive frequency. Separate coil drive and lamp drive oscillators are employed for such purpose. The coil is operated at 50 to 60 kHz to keep the physical size of the inductor small. An output voltage limiting means may also be advantageously employed to prevent damage to the integrated circuit output componentry.

In another aspect of the invention, discrete circuit components are utilized to provide circuitry equivalent to the aforementioned integrated circuit chip inverter.

Other aspects, features and advantages of the invention will be more fully apparent from the ensuing disclosure and appended claims.

DETAILED DESCRIPTION OF THE INVENTION, AND PREFERRED EMBODIMENTS THEREOF

The present invention relates to a low noise electroluminescent lamp driver assembly for low noise operation of an electroluminescent lamp. The driver assembly includes an integrated circuit driver that is arranged for coupling with a power source and with an electroluminescent lamp. The power source may be of any suitable type, including AC and/or DC power supplies, photovoltaic power supplies, fuel cell and electrochemical power sources, etc., and the power source may be of a fixed or portable character. In like manner, the electroluminescent lamp that is coupled to the integrated circuit driver may be of any suitable type.

The integrated circuit driver is constructed, arranged and operated to produce an AC output signal for powering the electroluminescent lamp. An inductor/resistor/capacitor circuit is operatively coupled to the integrated circuit driver to produce an AC output for powering the electroluminescent lamp in a low noise operational regime, and arranged to produce a peak to peak AC output voltage of at least 170 volts and an AC output frequency below 150 Hertz.

In one preferred embodiment, the inductor/resistor/capacitor circuit is arranged to produce a peak to peak AC output voltage of from about 170 to about 220 volts, or even higher voltage values.

In the low noise electroluminescent lamp driver assembly of the invention, the AC-driven integrated circuit driver may be of any suitable type, e.g., an IMP528 integrated circuit, an IMP803 integrated circuit, an HV-803 integrated circuit, etc. The inductor/resistor/capacitor circuit in the low noise electroluminescent lamp driver assembly of the invention may comprise a switching oscillator frequency setting resistor and other componentry as hereinafter more fully described.

In one embodiment of the invention, the low noise electroluminescent lamp driver assembly may include an inductor/resistor/capacitor circuit arranged to produce a peak to peak AC output voltage in the range of from about 170 to about 220 volts and a frequency below about 100 Hertz, and more preferably below about 90 Hertz, e.g., in the range of from about 60 to about 75 Hertz.

Figure 1:
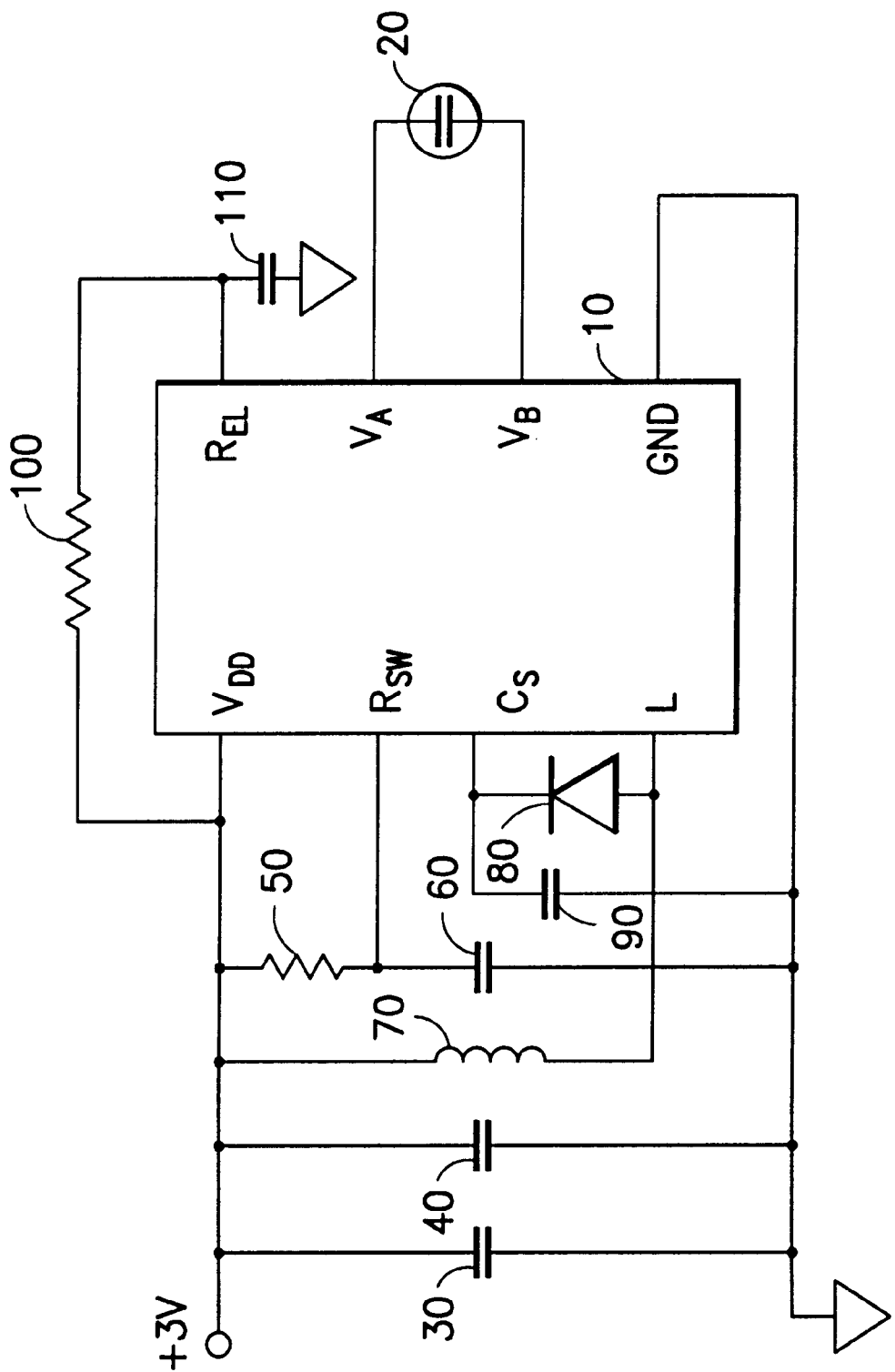
FIG. 1 depicts a low frequency electroluminescent lamp drive circuit according to one embodiment of the present invention, utilizing an integrated circuit electroluminescent lamp driver and associated discrete components.

Referring now to the drawings, FIG. 1 depicts a low frequency electroluminescent lamp drive circuit according to one embodiment of the present invention. The illustrated circuitry employs an integrated circuit electroluminescent lamp driver and associated discrete components.

As illustrated in FIG. 1, an integrated circuit electroluminescent (EL) lamp driver 10 is provided in the driving circuitry. The lamp driver 10 is configured, through selection and arrangement of associated discrete components, to drive the EL lamp 20. EL lamp driver 10 is, in one embodiment, an IMP528 integrated circuit device, commercially available from IMP, Inc. (San Jose, Calif.).

In other embodiments of the invention, the EL lamp driver 10 may comprise an IMP803 integrated circuit driver, also commercially available from IMP, Inc. (San Jose, Calif.), or alternatively an HV-803 integrated circuit driver, commercially available from Supertex, Inc. (Sunnyvale, Calif.).

The EL lamp driver 10 is powered by a suitable power supply, e.g., a 3.0 volt DC source (not shown). The supply voltage is filtered by capacitors 30 and 40, which may be of appropriate capacitance character, as for example having a capacitance of 100 $\mu$F and 0.1 $\mu$F, respectively.

A switching oscillator frequency setting resistor 50 controls the frequency of the switching oscillator within EL lamp driver 10, and may for example have a resistance on the order of 1 M-ohm.

Bypass capacitors 60 and 110 are provided, of suitable capacitance rating, e.g., preferably on the order of about 0.001 $\mu$F.

A flyback inductor 70 provides a necessary voltage boost by means of inductive "flyback," and may for example have an inductance of 470 H and a series DC resistance of 4.2 ohms. In one embodiment, inductor 70 is a Murata LQN6, commercially available from Murata Electronics North America, Inc., 2200 Lake Park Drive, Smyrna, Ga. 30080.

A catch diode 80 is provided, which allows charging of storage capacitor 90, when it is forward biased, based on the switching of flyback inductor 70 within the electroluminescent lamp driver 10. The voltage applied across electroluminescent lamp 20 is equal to twice the voltage at storage capacitor 90. EL lamp oscillator frequency setting resistor 100 has an appropriate resistance value to establish a suitable electroluminescent lamp drive oscillator frequency.

Figure 2:
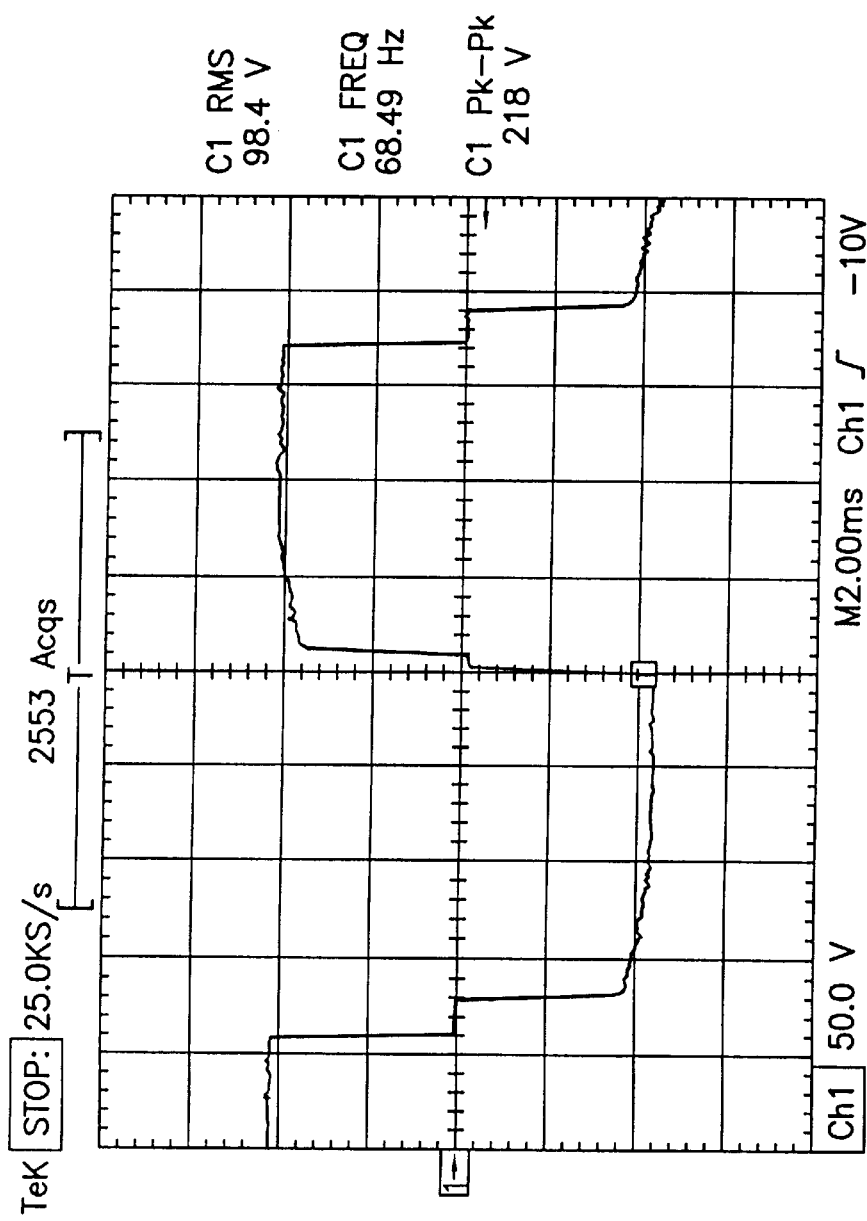
FIG. 2 shows a representative waveform of the drive signal applied to the electroluminescent lamp in a manner according to one embodiment of the present invention.
Figure 3:
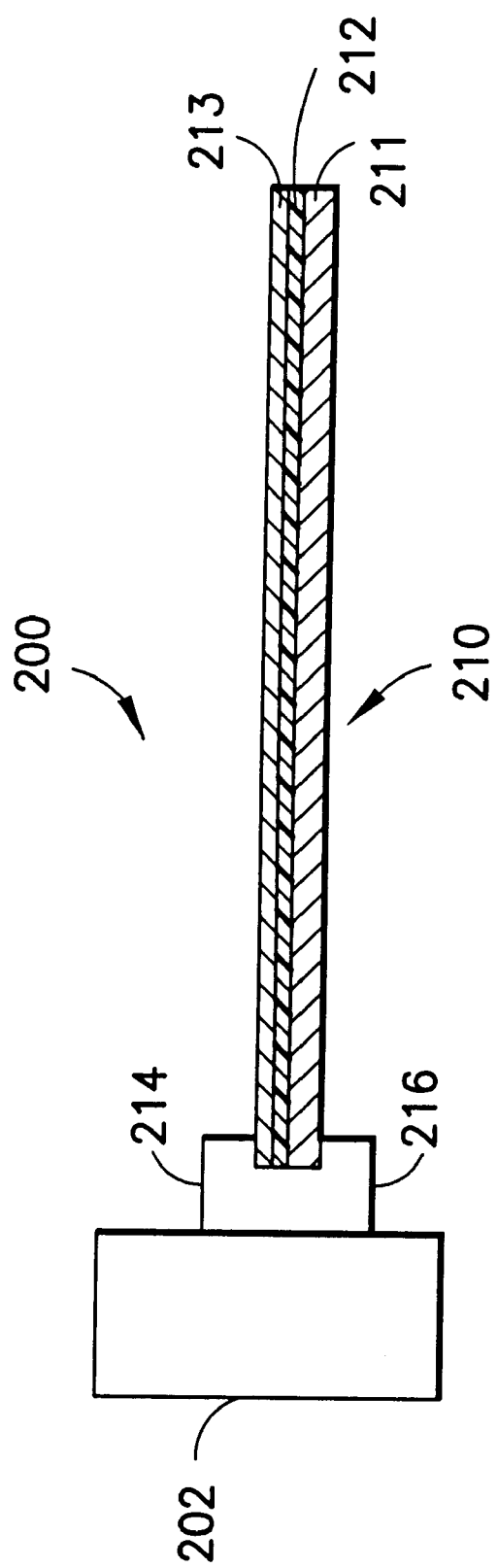
FIG. 3 is a elevational view of an electroluminescent lamp assembly according to one embodiment of the present invention, incorporating an electroluminescent lamp drive circuit and power supply module.

FIG. 2 shows a representative waveform of the drive signal applied to the electroluminescent lamp illustrating the operation of one embodiment of the present invention, using an IMP-528 chip inverter driver having the following characteristics:

Rel=10 Mohms
Idc=16.8 milliamps
Cc increased to 0.1 mfd
fL1=3.71
fL2=3.77
fL3=3.8
C1 root mean square=98.4 v
C1 frequency=68.49 Hertz
C1 peak to peak=218 v FIG. 3 is a elevational view of an electroluminescent lamp assembly 200 according to one embodiment of the present invention, incorporating an electroluminescent lamp drive circuit and power supply in the electronics module 202 for the assembly, and an electroluminescent lamp 210 (shown in cross-section).

The electroluminescent lamp 210 includes an electrode 211, which as shown functions as a conductive base plate or substrate. Electrode 211 can be formed of any suitable conductive material, such as aluminum, carbon, copper, silver, gold, iron, and the like. It is also within the scope of the invention to employ as the base plate a sheet of a plastic material, e.g., polyethylene, polypropylene, polycarbonate or polyvinylchloride, coated with a metal or metal oxide. Methods for coating plastic sheets, e.g., by vapor deposition, are known and well-established in the electroluminescent lamp art.

A layer 212 of a dielectric material having a phosphor dispersed or embedded therein is positioned in contact with the electrode or conductive layer 211. In general, any of a wide variety of dielectric materials known in the art as suitable phosphor containing media can be employed. Particularly useful dielectric materials include dielectric organic plastic materials, such as epoxy resins, fluoropolymers, polystryrene, polyethylene, polyvinylbutyral, polyvinylchloride, polyvinylacetate, polyvinylalcohol, polyesters, polyamides, polyacrylonitrile, polyacrylate, polymethylmethacrylate, and the like. It is also within the purview of the invention to use an inorganic medium, such as barium or strontium titanate.

Any of the phosphors conventionally known and used in the art may be employed. Examples include zinc sulfide doped with copper, manganese, mercury, silver, iron, cadmium, or rare earth elements, or alternatively activated or doped compounds such as zinc selenide, boron nitride, and aluminum nitride. The phosphors may be dispersed or incorporated in the dielectric medium as is well known in the art.

After placement of the dielectric layer 212 on base plate 211, a light transmitting electrode in the form of layer 213 is positioned on layer 212. Light transmitting electrodes are well known in the art and can be composed of transparent sheet materials, such as glass, Mylar film (polyethylene terephthalate), Zerlon film (polymer of methylmethacrylate and styrene), and various other commercially available film formed of known transparent synthetic resins. The transparent sheets or films are coated by well-known means, e.g., by vapor deposition of a metal, such as gold or silver, or an inorganic salt or oxide, such as indium, tin, cadium, etc., to provide a conductive layer or electrode 213.

Electrodes 211 and 213 can be of any desired thickness although the thickness of the light transmitting electrode is typically controlled to permit maximum transmission of light. Typically, the dielectric layer is of low thickness, e.g., a thickness on the order of 1–5 mils.

After assembly of the aforementioned layers, the layers may be laminated to provide an integrated electroluminescent lamp device, under suitable heat and compression conditions. The spaced apart electrodes are then provided with electrical leads 214 and 216 to complete the electroluminescent lamp, and the leads are then connected to the electronics module 202 to complete the electroluminescent lamp assembly.

If desired, the electroluminescent lamp can be packaged in a heat-sealed plastic envelope to provide additional resistance to moisture. Alternately the lamp can be unpackaged with moisture protection provided by moisture impervious coated phosphor particles.

As an alternative to the foregoing, the electroluminescent lamp may be fabricated with both top and bottom electrodes of the lamp being light transmissive in character.

The electroluminescent lamp of the present invention, by virtue of its capability of operating at decreased frequency in use, is correspondingly able to achieve an extended service life, relative to electroluminescent lamps continuously operating at higher frequency.

The features and advantages of the invention are more fully shown with respect to the following, non-limiting example.

EXAMPLE 1

The circuit of FIG. 1 was constructed using components as described above (having the illustrative characteristics noted in the preceding description), and successively using EL lamp driver IMP528 and IMP803. The circuit drove EL lamp 20, an electroluminescent lamp having a surface area of 2.1 in$^2$, model number X533-12, available from Luminescent Systems, Inc. (Lebanon, N.H.).

The electroluminescent lamp oscillator frequency setting resistor 100 was varied to drive the lamp at frequencies over a range from 60 to 400 Hertz. Two values of storage capacitor 90 were tested for each series of tests, using a different EL lamp driver.

The resulting data are summarized in Table I below.

TABLE I

| Electroluminescent Lamp Assembly Operating Characteristics | | | | | | | | |
|---|---|---|---|---|---|---|---|---|
| Rel [Mo] | Ide [mA] | Cs [uF] | fl1 | fl2 | fl3 | C1 rms [V] | C1 freq [Hz] | C1 pp [Vpp] |
| IMP583 Driver | | | | | | | | |
| 1 | 35.9 | 0.01 | 10.49 | 10.61 | 10.65 | 57.5 | 580.96 | 154 |
| 2 | 34.9 | 0.01 | 10.7 | 10.95 | 10.95 | 75.5 | 305.12 | 204 |
| 5.1 | 26.5 | 0.01 | 6.26 | 6.39 | 6.4 | 88.8 | 131.24 | 214 |

TABLE I-continued

Electroluminescent Lamp Assembly Operating Characteristics

| Rel [Mo] | Ide [mA] | Cs [uF] | fl1 | fl2 | fl3 | C1 rms [V] | C1 freq [Hz] | C1 pp [Vpp] |
|---|---|---|---|---|---|---|---|---|
| 10 | 11 | 0.01 | 3.58 | 3.68 | 3.68 | 95.2 | 69.25 | 216 |
| 1 | 34.9 | 0.1 | 9.95 | 10.1 | 10 | 60.7 | 580.96 | 138 |
| 2 | 34.9 | 0.1 | 10.29 | 10.46 | 10.36 | 80 | 306.76 | 182 |
| 5.1 | 27.2 | 0.1 | 6.61 | 6.72 | 6.68 | 96.1 | 129.02 | 218 |
| 10 | 16.8 | 0.1 | 3.71 | 3.77 | 3.8 | 98.4 | 68.49 | 218 |
| IMP803 Driver | | | | | | | | |
| 1 | 38.8 | 0.01 | 10.6 | 10.8 | 10.75 | 59.2 | 637.8 | 134 |
| 2 | 36.7 | 0.01 | 10.3 | 10.5 | 10.4 | 76.7 | 343.44 | 172 |
| 5.1 | 22.3 | 0.01 | 5.6 | 5.6 | 5.7 | 81.9 | 146.1 | 178 |
| 10 | 15.5 | 0.01 | 3.2 | 3.3 | 3.3 | 84.7 | 78.12 | 182 |
| 1 | 53 | 0.1 | 12.2 | 12.4 | 12.4 | 59.8 | 644.3 | 152 |
| 2 | 53.4 | 0.1 | 9.48 | 9.65 | 9.58 | 73.3 | 336.72 | 170 |
| 5.1 | 30.6 | 0.1 | 4.74 | 4.84 | 4.82 | 78 | 138.6 | 170 |
| 10 | 22.2 | 0.1 | 2.71 | 2.77 | 2.78 | 80.3 | 73.13 | 170 |

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art. The invention therefore is to be broadly construed, consistent with the claims hereafter set forth.

What is claimed is:

1. An electroluminescent lamp operating at a frequency at or below the lower threshold of human hearing, thereby reducing audible acoustic energy otherwise generated by electroluminescent lamp in operation at high frequency, said electroluminescent lamp assembly comprising:

an electroluminescent lamp;

an integrated circuit driver, arranged for coupling with a power source and with said electroluminescent lamp, and producing an AC output signal for powering said electroluminescent lamp; and an inductor/resistor/capacitor circuit operatively coupled to the integrated circuit driver to operate said electroluminescent lamp in a low noise operational regime in which said AC output signal has a peak to peak AC output voltage of at least about 170 volts and a frequency below 150 Hertz.

2. The electroluminescent lamp assembly of claim 1, wherein the inductor/resistor/capacitor circuit is arranged to produce a peak to peak AC output voltage of from about 170 to about 220 volts.

3. The electroluminescent lamp assembly of claim 1, wherein said AC-driven integrated circuit driver comprises an IMP528 integrated circuit.

4. The electroluminescent lamp assembly of claim 1, wherein said AC-driven integrated circuit driver comprises an IMP803 integrated circuit.

5. The electroluminescent lamp assembly of claim 1, wherein said AC-driven integrated circuit driver comprises an HV-803 integrated circuit.

6. The electroluminescent lamp assembly of claim 1, wherein said inductor/resistor/capacitor circuit comprises a switching oscillator frequency setting resistor.

7. The electroluminescent lamp assembly of claim 1, wherein said inductor/resistor/capacitor circuit is arranged to produce a peak to peak AC output voltage in the range of from about 170 to about 220 volts and a frequency below about 100 Hertz.

8. The electroluminescent lamp assembly of claim 1, wherein said inductor/resistor/capacitor circuit is arranged to produce a peak to peak AC output voltage in the range of from about 170 to about 220 volts and a frequency below about 90 Hertz.

9. The electroluminescent lamp assembly of claim 1, wherein said AC output signal has a peak to peak AC outlet voltage in the range of from about 170 to about 220 volts and a frequency between about 60 and about 100 Hertz.

10. The electroluminescent lamp assembly of claim 1, wherein said AC output signal has a frequency in the range between about 70 and about 90 Hertz.

11. The electroluminescent lamp assembly of claim 1, wherein said AC output signal has a frequency of approximately 60–70 Hertz.

12. The electroluminescent lamp assembly of claim 1, further comprising an associated power source, wherein said power source is selected from the group consisting of AC power supplies, DC power supplies, photovoltaic power supplies, fuel cell power supplies, electrochemical power supplies, and combinations thereof.

13. The electroluminescent lamp assembly of claim 1, further comprising an associated power source comprising a battery power supply.

14. The electroluminescent lamp assembly of claim 1, wherein said integrated circuit driver comprises an integrated circuit chip inverter arranged to drive the electroluminescent lamp at a frequency below 100 Hertz.

15. The electroluminescent lamp assembly of claim 1, wherein said AC output signal has a frequency in the range of from about 60–75 Hertz.

16. The electroluminescent lamp assembly of claim 1, wherein said inductor/resistor/capacitor circuit comprises a flyback inductor providing voltage boosting by inductive flyback.

17. A method of operating an electroluminescent lamp at a frequency at or below the lower threshold of human hearing to reduce audible noise output therefrom, said method comprising:

providing an integrated circuit driver assembly including:

an integrated circuit driver, arranged for coupling with a power source and with said electroluminescent lamp, and producing an AC output signal for powering said electroluminescent lamp; and an inductor/resistor/capacitor circuit operatively coupled to the integrated circuit driver; and operating the integrated circuit driver assembly in a low noise operational regime in which said AC output signal has a peak to peak AC output voltage of at least about 170 volts and an AC output frequency below 150 Hertz.

18. A method of operating an electroluminescent lamp at a frequency at or below the lower threshold of human hearing for low noise production during illumination operation thereof, said method comprising utilizing an integrated circuit driver that is coupled with a power source and with said electroluminescent lamp, and has an inductor/resistor/capacitor circuit operatively coupled thereto, for generating an AC output signal for powering the electroluminescent lamp, said AC signal having a peak to peak AC output voltage in the range of from about 170 to about 220 volts and an AC output frequency below 150 Hertz.

* * * * *